United States Patent
Murthy et al.

(10) Patent No.: US 11,860,268 B2
(45) Date of Patent: Jan. 2, 2024

(54) SYSTEMS AND METHODS USING MULTIPLE MODALITIES FOR OCCUPANCY SENSING

(71) Applicant: SIGNIFY HOLDING B.V., Eindhoven (NL)

(72) Inventors: Abhishek Murthy, Arlington, MA (US); Rohit Kumar, Acton, MA (US); Yuting Zhang, Winchester, MA (US); Chingiz Kabytayev, Cambridge, MA (US); Eric Bertrand Shen, Bedford, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 774 days.

(21) Appl. No.: 16/977,594

(22) PCT Filed: Feb. 25, 2019

(86) PCT No.: PCT/EP2019/054525
§ 371 (c)(1),
(2) Date: Sep. 2, 2020

(87) PCT Pub. No.: WO2019/166354
PCT Pub. Date: Sep. 6, 2019

(65) Prior Publication Data
US 2021/0041523 A1 Feb. 11, 2021

Related U.S. Application Data

(60) Provisional application No. 62/637,549, filed on Mar. 2, 2018.

(30) Foreign Application Priority Data

Mar. 9, 2018 (EP) ..................................... 18160862

(51) Int. Cl.
*G01S 13/86* (2006.01)
*F24F 11/46* (2018.01)
(Continued)

(52) U.S. Cl.
CPC .............. *G01S 13/86* (2013.01); *F24F 11/46* (2018.01); *F24F 11/56* (2018.01); *H05B 47/115* (2020.01); *H05B 47/13* (2020.01)

(58) Field of Classification Search
CPC .......... G01S 13/86; G01S 7/006; G01S 7/417; F24F 11/46; F24F 11/56; H05B 47/115; H05B 47/13; Y02B 20/40
See application file for complete search history.

(56) References Cited

U.S. PATENT DOCUMENTS

| 2012/0143357 A1 | 6/2012 | Chemel et al. |
| 2012/0299728 A1* | 11/2012 | Kirkpatrick .......... G06Q 10/109 340/541 |

(Continued)

FOREIGN PATENT DOCUMENTS

| JP | 2012-514829 A | 6/2012 |
| JP | 2016-092012 A | 5/2016 |

(Continued)

*Primary Examiner* — Ojiako K Nwugo

(57) ABSTRACT

A system and method for determining a number of occupants at a location using multiple modalities. The method includes gathering a first data set with a motion sensor of the lighting system. A second data set is gathered with a transceiver of an RF subsystem. First and second estimates are calculated from the second data set using first and second algorithms. The first estimate and the second estimate are fused to create a fused occupant estimate. The first algorithm, the second algorithm, or both the first algorithm and the second algorithm are trained by inputting the second occupant estimate and/or the second set of data to recalibrate parameters of the first algorithm and/or inputting the first occupant estimate and/or the first set of data to recalibrate (Continued)

parameters during training of the second algorithm. A building control system can operated in response to the fused occupant estimate.

15 Claims, 5 Drawing Sheets

(51) Int. Cl.
*F24F 11/56* (2018.01)
*H05B 47/115* (2020.01)
*H05B 47/13* (2020.01)

(56) References Cited

U.S. PATENT DOCUMENTS

| | | | | |
|---|---|---|---|---|
| 2014/0028199 | A1* | 1/2014 | Chemel | H05B 45/10 |
| | | | | 315/201 |
| 2014/0107846 | A1* | 4/2014 | Li | H04W 4/33 |
| | | | | 700/275 |
| 2014/0226855 | A1 | 8/2014 | Savvides et al. | |
| 2014/0292208 | A1* | 10/2014 | Chemel | H05B 45/12 |
| | | | | 315/154 |
| 2014/0297001 | A1* | 10/2014 | Silverman | G05B 15/02 |
| | | | | 700/19 |
| 2016/0294492 | A1* | 10/2016 | Mostofi | H04B 17/318 |
| 2017/0082741 | A1 | 3/2017 | Adib et al. | |
| 2017/0103633 | A1 | 4/2017 | Khire et al. | |
| 2017/0125875 | A1 | 5/2017 | Courtney et al. | |
| 2017/0135180 | A1* | 5/2017 | Broers | H05B 47/175 |
| 2017/0163909 | A1* | 6/2017 | Nakash | G06T 7/215 |
| 2017/0178473 | A1* | 6/2017 | Chen | G08B 13/1645 |
| 2017/0285603 | A1* | 10/2017 | Gerbus | G05B 15/02 |
| 2017/0303366 | A1* | 10/2017 | Ciccarelli | H05B 47/11 |
| 2017/0328997 | A1 | 11/2017 | Silverstein et al. | |
| 2018/0012467 | A1* | 1/2018 | Chen | G08B 13/2494 |
| 2018/0242430 | A1* | 8/2018 | Gopal Samy | H05B 47/175 |

FOREIGN PATENT DOCUMENTS

| | | |
|---|---|---|
| JP | 2016-122373 A | 7/2016 |
| WO | 2018/024533 A1 | 2/2018 |

\* cited by examiner

SYSTEMS AND METHODS USING MULTIPLE MODALITIES FOR OCCUPANCY SENSING

CROSS-REFERENCE TO PRIOR APPLICATIONS

This application is the U.S. National Phase application under 35 U.S.C. § 371 of International Application No. PCT/EP2019/054525, filed on Feb. 25, 2019, which claims the benefit of U.S. Provisional Application No. 62/637,549, filed on Mar. 2, 2018 and European Patent Application No. 18160862.1, filed on Mar. 9, 2018. These applications are hereby incorporated by reference herein.

FIELD OF THE INVENTION

The present disclosure is directed generally to systems and methods for determining the number of occupants in a location, which can be particularly useful for operating a control system of the location in response to the determined number of occupants.

BACKGROUND

Automating building functions (e.g., heating, ventilation, and air conditioning, or HVAC systems, lighting systems, etc.) can be used to both optimize occupant comfort and minimize energy usage, and therefore cost, of maintaining a building. For example, passive infrared (PIR) sensors are a cost-efficient solution commonly deployed in buildings to control one or more systems in the building. PIR sensors are often used to automatically control when lighting fixtures are turned on and/or off depending on whether motion is detected by the PIR sensors. While these sensors can detect whether a location is occupied, they rely on a line of sight between the occupant and the sensor and are not well suited for determining how many occupants are at the location.

The use of radiofrequency (RF) waves to detect motion has also been utilized. In one system, RF waves have been used to detect and triangulate the number of cellphones (or other transceivers) in a location, which can be used as an analog to the number of occupants at the location. However, these approaches require the individuals to carry a cellphone or other device, which is restrictive to producing accurate occupancy counts. In another approach, RF signals reflected from humans are detected and analyzed to measure occupancy of the space. However, these RF systems can suffer from multi-path reflections and the near-far problem in which far away occupants are hidden by reflections off of nearer occupants.

Accordingly, there is a continued need in the art for systems that improve the ability for a system to accurately determine the number of occupants in a location, particularly where a control system for the location is controlled in response to the determined number of occupants.

SUMMARY OF THE INVENTION

The present disclosure is directed to inventive systems and methods for determining the number of occupants in a location, and more particularly for operating a control system of the location in response to the determined number of occupants.

The disclosed system may include both a motion detector subsystem including one or more motion sensors, such as a lighting system having one or more embedded PIR sensors, and a radiofrequency (RF) subsystem including one or more RF transceivers, such as a network router. Data gathered by the RF transceivers is used to generate a first occupant estimate with a first algorithm and the data gathered by the motion sensors is used to generate a second occupant estimate with a second algorithm. The estimates produced by the two sensor modalities are fused to produce an accurate count of occupants at a location. The first and second algorithms can be trained by using the data and/or estimate related to each subsystem as an input to the algorithm associated with the other subsystem, thereby further improving their respective accuracies over time. Accurate occupant estimates can be used to operate a control system of the location, such as to provide better or more efficient lighting, temperature, ventilation, and space optimization, thereby maximizing the energy efficiency and occupant comfort of the building.

Generally, in one aspect a method for determining a number of occupants at a location using multiple modalities is provided, The method includes gathering a first set of data from one or more motion sensors embedded in a lighting system in the location; calculating a first occupant estimate from the first set of data using a first algorithm associated with the lighting system; gathering a second set of data from one or more radiofrequency (RF) transceivers of an RF subsystem in the location; calculating a second occupant estimate from the second set of data using a second algorithm associated with the RF subsystem; fusing the first occupant estimate and the second occupant estimate to create a fused occupant estimate corresponding to the number of occupants at the location; training the first algorithm, the second algorithm, or both the first algorithm and the second algorithm by performing at least one of (i) inputting the second occupant estimate, the second set of data, or both, to recalibrate parameters of the first algorithm and (ii) inputting the first occupant estimate, the first set of data, or both, to recalibrate parameters of the second algorithm.

According to an embodiment, the method further includes operating a building control system in the location in response to the fused occupant estimate. According to an embodiment, the building control system includes a security system, a heating ventilation and air conditioning (HVAC) system, a sound masking system, the lighting system, or a combination including at least one of the foregoing. According to an embodiment, the one or more motion sensors comprises a passive infrared (PIR) sensor and the one or more RF transceivers includes a Wi-Fi enabled router. According to an embodiment, gathering the second set of data includes emitting RF waves with the at least one RF transceiver and receiving reflections of the RF waves with the at least one RF transceiver.

According to an embodiment, the training, prior to gathering the first or second set of data, further includes inputting data representative of a physical layout of the location, inputting data representative of coordinates of each the one or more RF transceivers, inputting data representative of coordinates of each of the one or more motion sensors, or a combination including at least one of the foregoing. According to an embodiment, the second set of data includes data representative of RF reflections from distant occupants that were obfuscated by RF reflections from nearer occupants, and the training includes contemporaneously or synchronously comparing the first set of data and the coordinates of each of the one or more motion sensors to the second set of data to localize positions of the distant occupants. According to an embodiment, the first algorithm comprises a function that is fit to a plurality of data points that describe a number of the motion sensors that are triggered with respect to a true occupant count in the location, and the training includes synchronously comparing the first data set to the second data set to form one or more new data points in which the true occupant count is set as the second occupant estimate, and recalculating the function after including the one or more new data points in the plurality of data points.

According to an embodiment, training the first algorithm further includes building a surrogate model and simulating how many of the one or more motion sensors are triggered in response to different true occupancies and determining a function that maps the number of triggered sensors to the true occupancy.

According to an embodiment, the fusing includes calculating the fused occupant estimate from:

$$N = \frac{\frac{N_{MD}}{V_{MD}} + \frac{N_{RF}}{V_{RF}}}{\frac{1}{V_{MD}} + \frac{1}{V_{RF}}}$$

where N is the fused occupant estimate, $N_{MD}$ is the first occupant estimate, $N_{RF}$ is the second occupant estimate, $V_{MD}$ is a first variance associated with the lighting system, and $V_{RF}$ is a second variance associated with the RF subsystem.

Generally, in one aspect, a controller for operating a building control system is provided. The controller includes a communication module configured to receive a first set of data from a lighting system having one or more motion sensors and a second set of data from a radiofrequency (RF) subsystem having one or more RF transceivers; a memory having a first algorithm associated with the lighting system and a second algorithm associated with the RF subsystem stored therein; a processor configured to calculate a first occupant estimate from the first set of data using the first algorithm and to calculate a second occupant estimate from the second set of data, and to train the first algorithm, the second algorithm, or both the first algorithm and the second algorithm by performing at least one of (i) inputting the second occupant estimate, the second set of data, or both, to recalibrate parameters of the first algorithm and (ii) inputting the first occupant estimate, the first set of data, or both, to recalibrate parameters of the second algorithm; and a fusion module configured to create a fused occupant estimate by fusing the first occupant estimate and the second occupant estimate; wherein the controller is configured to control operation of the building control system in response to the fused occupant estimate.

Generally, in one aspect, a system for determining a number of occupants at a location is provided. The system includes a lighting system including one or more motion sensors, the lighting system configured to gather a first set of data with the one or more motion sensors; a radiofrequency (RF) subsystem including one or more transceivers, the RF subsystem configured to gather a second set of data with the one or more transceivers; a controller configured to determine a first occupant estimate from the first set of data using a first algorithm associated with the lighting system and to determine a second occupant estimate from the second set of data using a second algorithm associated with the RF subsystem, wherein the controller is configured to train the first algorithm by inputting the second occupant estimate, the second set of data, or both, to recalibrate parameters of the first algorithm, to train the second algorithm by inputting the first occupant estimate, the first set of data, or both, to recalibrate parameters the second algorithm, or a combination including at least one of the foregoing; and a fusion module configured to create a fused occupant estimate by fusing the first occupant estimate and the second occupant estimate.

According to an embodiment, the system further includes a building control system configured to operate in response to the fused occupant estimate. According to an embodiment, the building control system includes a security system, a heating ventilation and air conditioning (HVAC) system, a sound masking system, the lighting system, or a combination including at least one of the foregoing. According to an embodiment, the one or more motion sensor is a passive infrared sensor and the RF subsystem includes at least one network router that comprises the transceiver.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of systems and methods for controlling operation of a control system of a location. More generally, Applicant has recognized and appreciated that it would be beneficial to control operation of control system of a location based on a number of occupants in a location. A particular goal of certain embodiments of the present disclosure is to accurately determine a number of occupants in a location to increase the efficiency and/or effectiveness of a control system for that location.

In view of the foregoing, various embodiments and implementations are directed to a system and method for determining a number of occupants in a location and operating a control system of the location in response to the number of occupants. The disclosed system may include both a motion detector subsystem including one or more motion sensors, such as a lighting system having one or more embedded PIR sensors, and a radiofrequency (RF) subsystem including one or more RF transceivers, such as a network router. Data gathered by the RF transceivers is used to generate a first occupant estimate with a first algorithm and the data gathered by the motion sensors is used to generate a second occupant estimate with a second algorithm. The estimates produced by the two sensor modalities are fused to produce an accurate count of occupants at a location. The first and second algorithms can be trained by using the data and/or estimate related to each subsystem as an input to the algorithm associated with the other subsystem, thereby further improving their respective accuracies over time. Accurate occupant estimates can be used to operate a control system of the location, such as to provide better or more efficient lighting, temperature, ventilation, and space optimization, thereby maximizing the energy efficiency and occupant comfort of the building.

Figure 1:
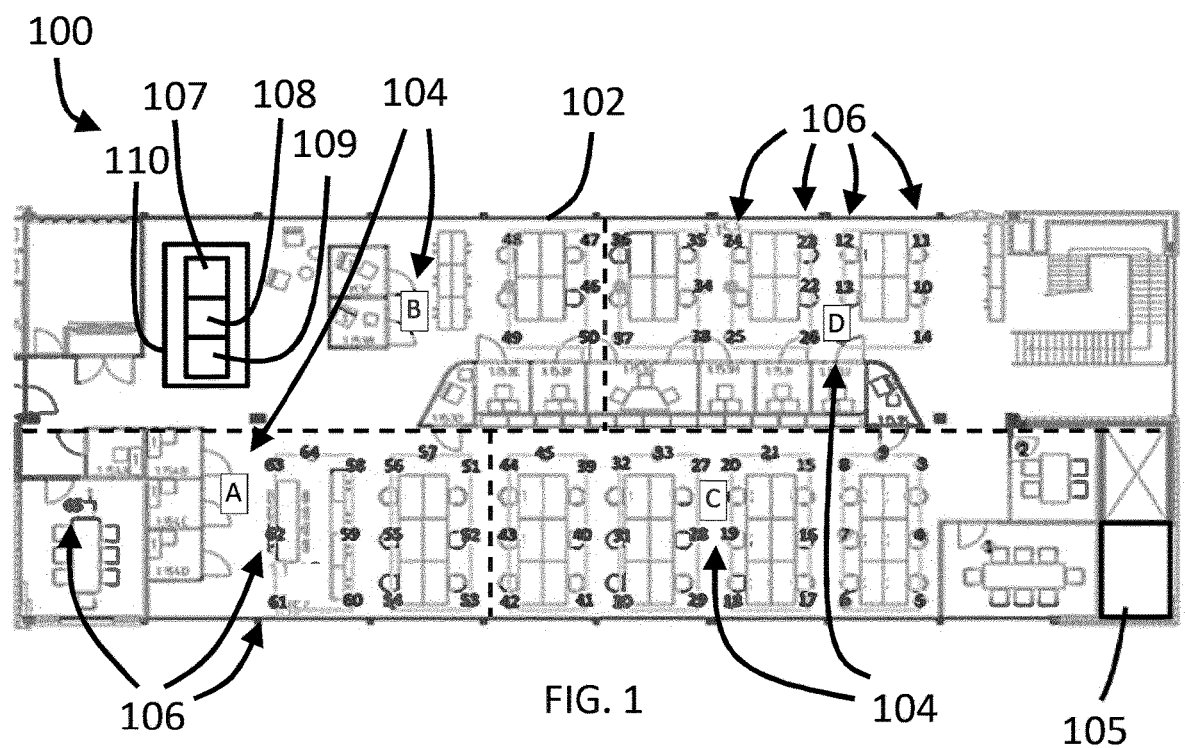
FIG. 1 schematically illustrates a system for determining a number of occupants in a location and operating a control system of the location in response to the number of occupants according to one embodiment disclosed herein.

Referring to FIG. 1, in one embodiment, a system 100 is provided to determine a number of occupants (e.g., number of people) within a location 102 using multiple modalities. The operation of certain functions or features of the location can be controlled in response to the determined number of occupants. The system 100 includes a radiofrequency (RF) subsystem designated herein with the reference numeral 104, and a motion detector subsystem designated herein with the reference numeral 106. As will be described in more detail below, the RF subsystem 104 and the motion detector subsystem 106 are together used to determine the number of occupants in the location 102. The term "occupant" may be used herein interchangeably with "individual" and these terms are intended to refer primarily to people, but it is to be appreciated that these terms could alternatively in some embodiments refer to animals, insects, etc., or even non-living entities that move in, out, and/or about an environment (e.g., due to wind, water currents, etc.).

In FIG. 1, the location 102 is illustrated as an office space having desks, workstations, conference rooms, etc., but it is to be appreciated that any other area, indoor or outdoor, could be monitored. The system 100 may include a control system 105, or more specifically, if the location 102 is a building (e.g., office space), the control system 105 may be referred to as a building control system. For example, the control system 105 may be, or include, a heating ventilation and air conditioning (HVAC) system, a sound masking system, a lighting system, a security system, or any other system or functionality useful to the location 102.

The RF subsystem 104 includes one or more transceivers capable of transmitting and receiving radiofrequency (RF) waves. By transceiver it is meant any device, or combination of devices (e.g., a separate transmitter and receiver) capable of transmitting and receiving RF waves. In FIG. 1, the position of four such transceivers are indicated by the reference characters A, B, C, and D. In one embodiment, the transceivers of the RF subsystem 104 are, or include, Wi-Fi enabled routers. It is to be appreciated that other radiofrequency-based communication or signal generating and receiving systems could be implemented via any combination of relevant hardware and/or software known or developed in the art.

It is to be appreciated that any RF-based detection technology could be used for the subsystem 104. For example, RF waves have been used in the art to identify the movement of individuals based on a transceiver, such as a smartphone, held by the individuals. It has also been found that RF waves can be used to track people throughout a location based on the reflections of the RF waves transmitted and then received by a transceiver, as discussed in more detail below. Advantageously, RF transceivers in the form of networked Wi-Fi routers are pervasive in many buildings and are thus well suited to form the RF subsystem 104 in many common environments.

The motion detector subsystem 106 in FIG. 1 includes sixty-five motion sensors designated with the numerals 1 through 65 in that figure. "Motion sensors" as used herein refers to any device or technology that detects objects or movement of objects within a direct line of sight or field of vision of the sensors. It is to be appreciated that motion can be determined based on various parameters detected by the sensor that are indicative of motion. For example, many common motion detectors detect motion based on sensed differences in heat between the moving object and the surrounding environment. In one embodiment, the motion sensors include passive infrared (PIR) sensors, although other motion sensors could be used, such as a camera or other sensor capable of receiving visible light signals.

Lighting systems ubiquitous infrastructures in buildings and office spaces. So-called "smart" lighting systems feature one or more luminaires equipped with Light-Emitting Diodes (LEDs) or other controllable light sources, which may be connected to each other and/or other network devices via Ethernet or wireless networks. The luminaires also have PIR or other sensors for controlling operation of the lights in an energy-efficient fashion (e.g., the sensors enabling the lights to automatically turn on/off depending on whether there is detected movement). Connectivity enables the individual luminaires to work together to maximize energy efficiency and enables remote monitoring and predictive maintenance of the system. Advantageously, this type of existing lighting system, having embedded PIR or other motion sensors, can be used to form the motion detector subsystem 106. Other existing systems having motion sensors, such as security systems or the like, could alternatively or additionally be utilized, or motion sensors could be deployed specifically for the purpose of forming the motion detector subsystem 106.

Figure 2:
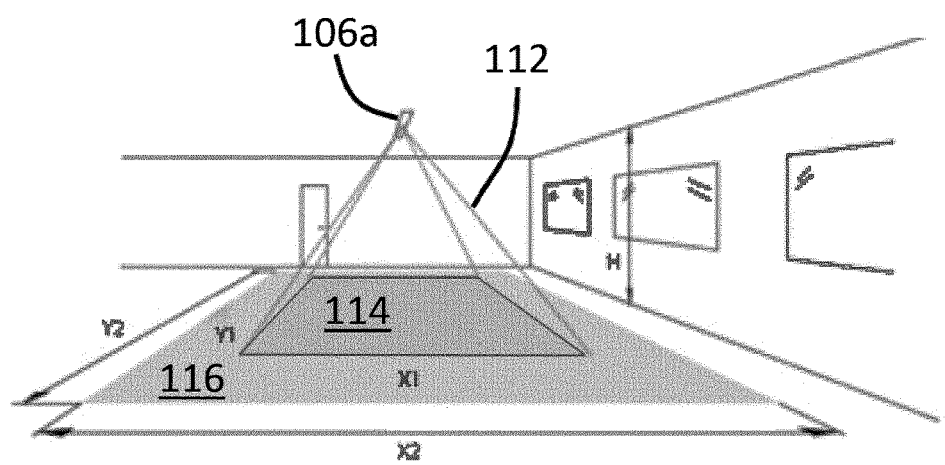
FIG. 2 schematically illustrates a light fixture having a PIR sensor, which can be used to form an LOS subsystem according to one embodiment disclosed herein.

FIG. 2 illustrates on example of a motion sensor-enabled device in the form of a ceiling-mounted light fixture (or luminaire) 106a having an embedded PIR sensor that enables the light fixture 106a to turn on/off depending on detected motion. A lighting system could include one or more of the light fixtures 106a. The PIR sensor has a field of vision 112, which generally takes a conical or pyramidal shape having a height H originating at the PIR sensor. The light fixture 106a and/or other motion sensors used by the subsystem 106 may additionally or alternatively include the ability to distinguish between different types of movement. For example, the motion sensors may be able to distinguish between "major" (e.g., an entire body moving) and "minor" (e.g., just a limb of a body moving) movements such as via the relative detected size of the moving object and/or the detected speed of movement.

Additionally, the light fixture 106a or other motion sensor of the motion detector subsystem 106 may be able to recognize a plurality of different physical areas or zones, such as a first zone 114 bounded by X1 and Y1 and a second zone 116 bounded by X2 and Y2 in FIG. 2 (e.g., by using multiple sensors as is generally known in the art). The zones could be arranged in any pattern, such as a grid, concentric circles, etc. In this way, each motion sensor can define one or more individual zones of the location 102. The individual zones can be combined to create more general zones that correspond to larger areas of the location 102. For example, referring back to FIG. 1, the location 102 is separated generally into four different zones indicated by dashed lines, although it is to be appreciated that the location 102 could be any other number of zones. In this way, the motion sensors can be used to determine not just a total number of occupants, but also the relative position, or locality, of the occupants. Additionally, this information could be used by the control system 105 to enable, disable, or alter functionality of its components in only specific areas (e.g., reduce the temperature in one zone while maintaining the temperature in all other zones).

The system 100 may also include a controller 110 having a processor 107, a memory 108, and/or a communication module 109. The controller 110 can be utilized to store the data gathered by the subsystems 104 and 106 (e.g., in the memory 108) and/or to calculate the occupancy based on the gathered data (e.g., with the processor 107). In one embodiment, the controller 110 is also used to control the components of the control system 105 (e.g., HVAC system). Alternatively, the control system 105 may include a separate controller akin to the controller 110 that is in communication with the controller 110. As should be appreciated in view of the above-description, elements of the various systems and subsystems may be shared (e.g., the control system 105 may control operation of Wi-Fi enabled routers that form the subsystem 104, or control operation of a lighting system, which includes PIR or other sensors that form the subsystem 106). The controller 110 may be part of either of the subsystems 104 and/or 106, the control system 105, or separate from, but in communication with, these systems and subsystems. It is to be appreciated that the multiple controllers could be used in lieu of the single controller 110, e.g., the subsystem 104 and the subsystem 106 may have separate controllers that communicate with each other. The transceivers of the subsystem 104, the sensors of the motion detector subsystem 106, the components of the control system 105, and the controller 110 may communicate with or amongst each other via any wired or wireless communication technology (e.g., Bluetooth, Wi-Fi, Zigbee, Ethernet, etc.).

The processor 107 may include any suitable form of device, mechanism, or module configured to execute software instructions such as a microcontroller, plural microcontrollers, circuitry, a single processor, or plural processors. The memory 108 may include any suitable form or forms, including a non-volatile memory or volatile memory. Volatile memory may include random access memory (RAM). Non-volatile memory may include read only memory (ROM), flash memory, a hard disk drive (HDD), a solid state drive (SSD), or other data storage media. The memory 108 may be used by the processor 107 for the temporary storage of data during its operation. Data and software, such as the data gathered by the subsystems 104 and 106 and the algorithms discussed below, an operating system, firmware, or other data or application may be installed or stored in the memory 108. The communication module 109 can be or include any transmitter, receiver, antenna, radio, or other communication device, mechanism, or technology, as well as software configured to enable operation thereof.

Figure 3:
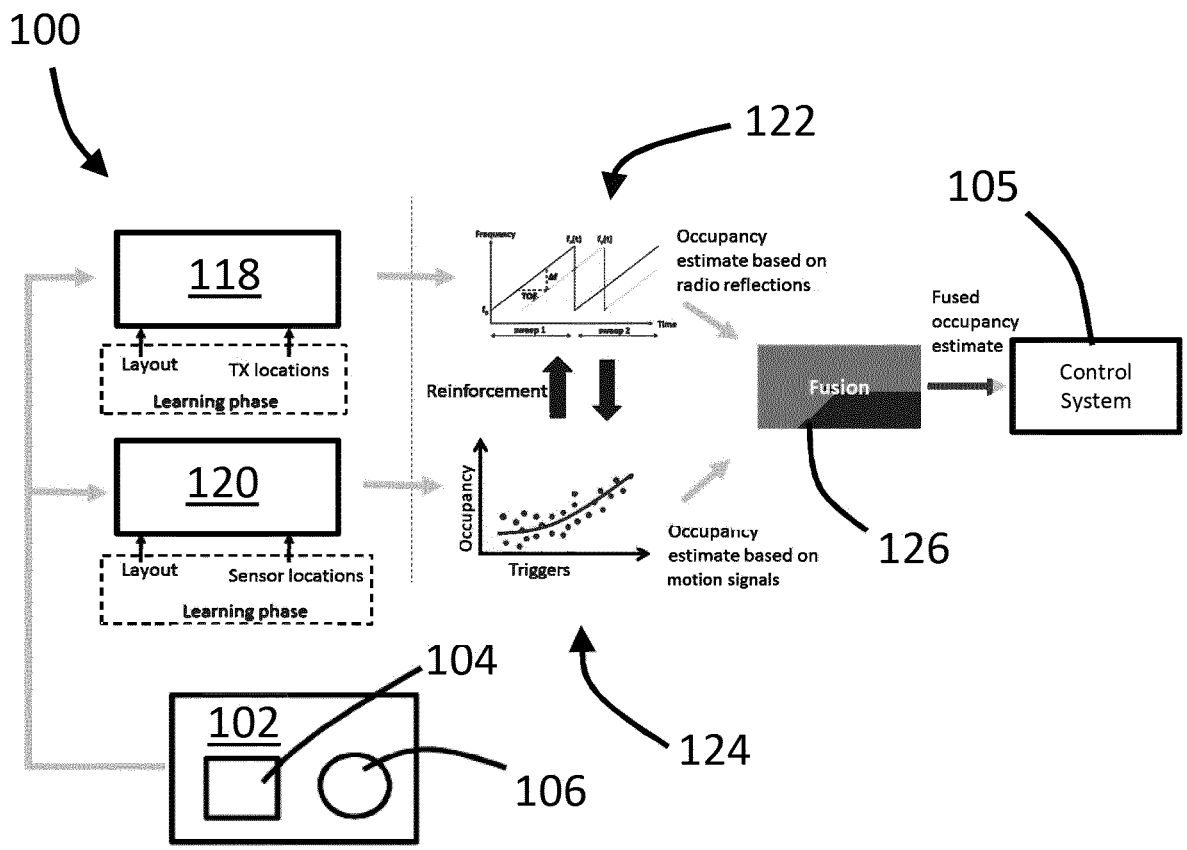
FIG. 3 is a block diagram illustrating additional components of the system of FIG. 1 according to one embodiment disclosed herein.

FIG. 3 includes a block diagram from which further aspects of the operation and structure of the system 100 can be appreciated. In order to determine the number of occupants, the system 100 may include a first algorithm 118 (or "RF algorithm 118"), which is built and/or trained to estimate the occupancy of the location 102 based on a first set of data (or "RF data") measured by the RF subsystem 104 (e.g., data corresponding to reflected RF waves), and a second algorithm 120 (or "motion detector algorithm 120"), which is built and/or trained to estimate the occupancy of the location based on a second set of data ("motion data") measured by the motion detector subsystem 106 (e.g., data corresponding to detected movement in the field of vision of each motion sensor). In one embodiment the first and/or second algorithms 118 and 120 are or employ the use of machine learning algorithms. It is to be appreciated that any number of machine learning systems, architectures, and/or techniques, e.g., artificial neural networks, deep learning engines, etc. could be utilized.

In order to build and/or train the RF algorithm 118, the layout of the location 102 (e.g., data describing the physical layout of the location 102, such as the boundaries of different zones, the location of each desk or workstation, etc.) can be provided to the RF algorithm 118 as an input. Additionally, the RF algorithm 118 may receive as an input the location or coordinates of each of the transceivers (TX) of the RF subsystem 104. Similarly, the motion detector algorithm 120 may receive as inputs the layout of the location 102 as well as the location or coordinates of the sensors of the motion detector subsystem 106. The location coordinates can be provided according to any reference coordinate system. For example, if the motion sensors are embedded as part of the luminaire (e.g., as discussed with respect to the light fixture 106a), this information can be determined from a commissioning database for the lighting system. The location of other notable features, such as desks, particular zones, etc. can also be set using the same coordinate system.

In operation, the algorithms 118 can be utilized to calculate a first occupant estimate 122 (or RF-based estimate 122) based on the RF data measured by the RF subsystem 104 and a second occupant estimate 124 (or motion-based estimate 124) based on the motion data measured by the motion detector subsystem 106. As discussed in more detail below, the estimates 122 and 124 can be used to help reinforce performance of the algorithms 118 and 120 by providing the RF-based estimate 122 to help train the motion detector algorithm 120 and the motion-based estimate 124 to help train the RF algorithm 118. Additionally, as also discussed in more detail below, the estimates 122 and 124 can be fused or combined at a fusion module 126 to produce a final fused occupancy count or estimate. In one embodiment, the controller 110 includes the fusion module 126, which can be implemented via software, e.g., installed in the memory 108 of the controller 110. The controller 110 can be used to perform the reinforcement, e.g., via the fusion module 126 if the reinforcement is performed as part of the fusion process.

The fused occupant estimate can be sent to a control system for the location, e.g., the control system 105 of the location 102, to enable, disable, and/or otherwise modify the function or operation of components of the control system (e.g., increase or decrease temperature, turn on/off ventilation fans, change the intensity of a sound masking system, etc. in response to the changing numbers of occupants). As noted above, the estimates 122 and 124, and thus the fused estimate, may correlate the occupants to different coordinates or zones, to enable the control system 105 to control operation separately and/or differently in each zone.

It is noted that the inputs to the RF and motion detector algorithms 118 and 120 in both training and operation can additionally be developed from data from the location 102 and/or the subsystems 104 and 106, depending on the particular construction of the system 100. In one embodiment, the RF subsystem 104 is, includes, or is arranged using the structure and/or principles of the WiTrack system developed by the Massachusetts Institute of Technology. In this embodiment, the RF subsystem 104 would operate by transmitting an RF signal and capturing its reflections off a human body. Occupant estimates would be generated based on the received data from the reflected RF waves, as described generally below.

In one non-limiting example, the RF algorithm 118 may take the data received by the RF subsystem 104 to track the motion of occupants by processing the signals from the transceivers (e.g., receiver antennas). First, the time-of-flight (TOF) can be measured as the time it takes for a signal to travel from a transceiver (e.g., transmitting antenna) of the RF subsystem 104 to the reflecting body, and then back to the transceiver (e.g., receiving antenna) of the RF subsystem 104. An initial measurement of the TOF can be obtained using a frequency modulated carrier wave (FMCW) transmission technique. The estimate can be cleaned to eliminate multipath effects and abrupt jumps due to noise. Once the TOF is determined, as perceived from each of the transceivers (e.g., receiving antennas), the geometric placement of the transceivers (e.g., based on the coordinate inputs noted above) can be utilized to localize the moving body in three dimensions. Additionally, this type of system can be used to detect a fall by monitoring fast changes in the elevation of an individual or object and the final elevation after the change. These systems can also be used to differentiate between minor movements, such as distinguishing between motion of an arm and motion of a whole body.

The algorithm 120 can be similarly built and used in accordance to its specific needs, e.g., to include simulations or field experiments that enable the algorithm 120 to correlate the sensed movement detection data of the motion detector subsystem 106 into an occupant estimate. In one specific non-limiting example, it can be assumed that occupancy of an area can be measured based on number of people using the space, such as via the number of desks that are occupied in an open office space. In this example, let $X=x_1, \ldots, x_N$ indicate "N" motion sensors in the location (i.e., the subsystem 106), and $Y=y_1, \ldots, y_M$ indicate "M" occupied desks (i.e., the estimated number of occupants). The motion sensors can be configured to detect or measure motion, e.g., output 1 if there is motion and 0 otherwise. In some embodiments, additional information, such as relative size or speed of the moving object could be determined. The number of sensors (N) can be large, and thereby the function approximation may not be trivial. Hence, to perform dimension reduction, the sum of triggered sensors, $B_{sum}$, can be determined as $B_{sum}=\Sigma_{i=1}^{N} x_i(t)$. Further, total desk occupancy, $A_{sum}$, can be given by $A_{sum}(t)=\Sigma_{i=1}^{M} y_i(t)$.

One of the key requirements for supervised learning algorithms (e.g., training of the algorithm 120) is access to labelled data (that is, data that relates to examples considered to be true, known, or the ground truth, upon which the algorithm is based, or learns if machine learning is utilized). This requires measuring a large amount of data for $\{X,Y\}$ as defined above. This can be done via actual experimentation, or by building a model that emulates the behavior in the location while being computationally tractable. This type of model may be referred to as a surrogate model.

Figure 4:
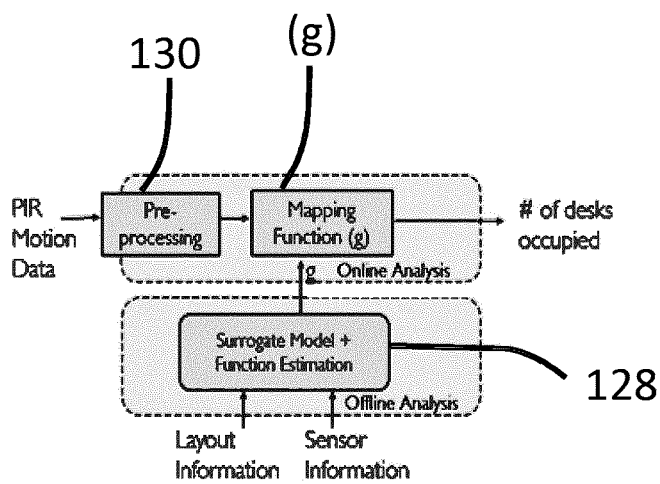
FIG. 4 is a block diagram illustrating a means for using a surrogate model to create a mapping function for estimating an occupancy of a location according to one embodiment disclosed herein.

FIG. 4 illustrates a block diagram describing how a surrogate model 128 can be used to create the algorithm 120 according to one embodiment. The surrogate model 128 can be used in an "offline" or learning phase to create a mapping function (g) defining or used by the algorithm 120 in an "online" or operational phase. As noted above, data pertaining to the physical layout of the location 102 as well as the coordinates of the motion sensors of the subsystem 106 and the desks in the location 102 can be set according to the same frame of reference or global coordinate system and provided to the model. In this way, the coordinate data can be considered as a bi-partite graph wherein motion sensors and desks are two disjoint sets, with an edge between a sensor and a desk for each desk is within the sensing region (e.g., the field of vision 112) of each sensor. In building the model 128, it can be assumed that if movement is detected in the field of view of a motion sensor, it will translate to the sensor identifying an occupied state, e.g., the sensor output will be 1.

Figure 5:
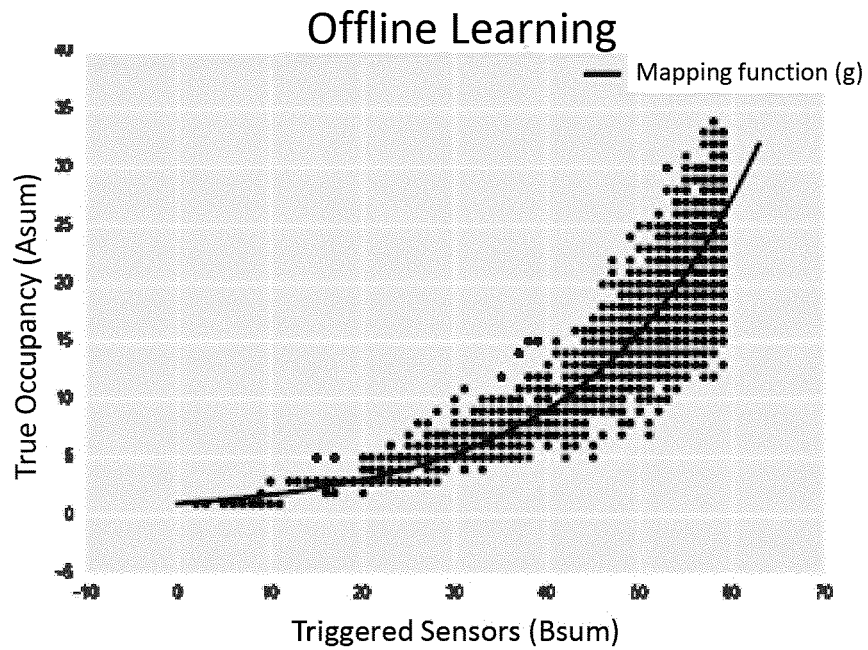
FIG. 5 is a graph illustrating how a mapping function for the diagram of FIG. 4 can be created according to one embodiment disclosed herein.
Figure 6:
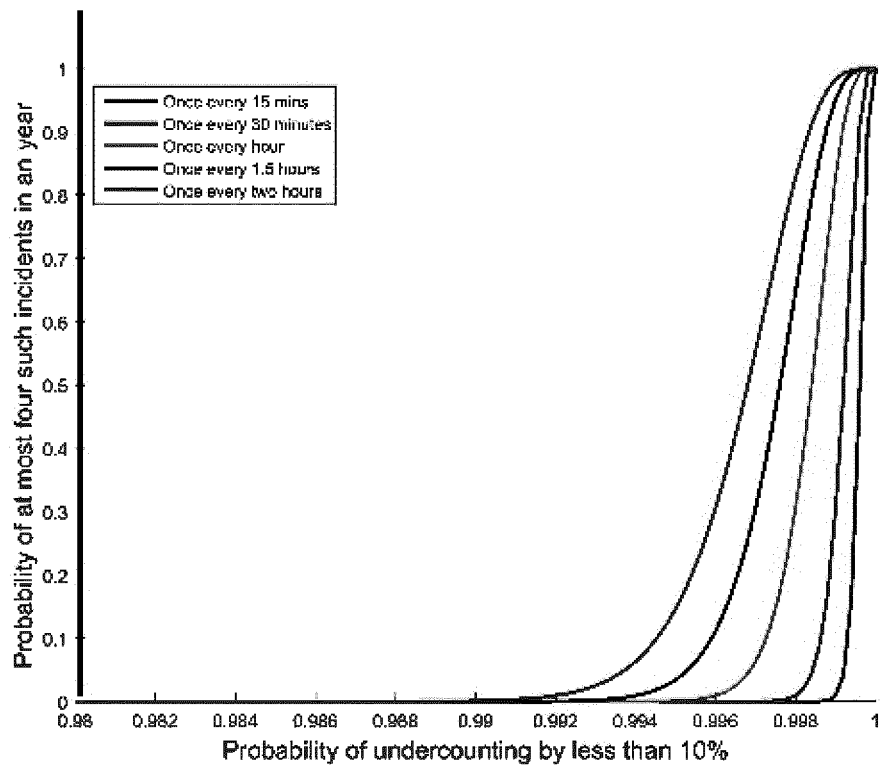
FIG. 6 is a graph which can be used as part of an error analysis according to one embodiment disclosed herein.

Given this surrogate model 128, data can be simulated by any desired method. In one embodiment, Monte Carlo analysis is performed by randomly simulating desk occupancy in the location 102 (giving known values for $A_{sum}$), and subsequently using the surrogate model 128 to determine the number of sensors that are triggered ($B_{sum}$, as defined above). After collecting a sufficiently large amount of data, one can determine a function (g) that maps the triggered sensors ($B_{sum}$) to occupant count ($A_{sum}$). One example is illustrated in FIG. 5 in which each dot represents a value of $B_{sum}$ calculated from different given values of true occupancy ($A_{sum}$) under different conditions (e.g., occupying desks in different zones), with the function (g) being the best approximation correlating $B_{sum}$ to true occupancy ($A_{sum}$). It should be appreciated that instead of the surrogate model 128, the function (g) could be generated by performing actual experimentations in the location by altering the true occupancy ($A_{sum}$) and measuring the number of triggered sensors ($B_{sum}$).

Another consideration is that it may be necessary to convert the actual or real-life motion/detection data from the motion sensors of the motion detector subsystem 106 to align with the surrogate model 128. That is, since the surrogate model 128 did not consider people moving about the location, and also did not consider both major and minor movement, real life scenarios in this example may tend to overestimate the number of occupants due to the increased sensor activity. For this, the multi-level information provided by motion sensors that differentiates between the major and minor movement, as noted above with respect to FIG. 2, can be exploited. Thus, it can be set or assumed that the minor movement is related to people working at their desks, and thus used to tally a value akin to $B_{sum}$ used by the surrogate model 128, while major movements are assumed to correspond to people transiently moving throughout the location 102 and thus not tallied. In this example, a preprocessing unit 130 is included and configured to evaluate the motion data to identify data related to both minor and major movements and to pass only the data related to minor movement to the mapping function (g) to determine occupant count. Of course, in other embodiments, it may be desirable to count both minor and major movement, or to tally only major movement while disregarding minor movement, or to process the motion data in some other manner to bring consistency between the surrogate model and the data measured by the motion detector subsystem 106 when in actual operation.

As noted above, the RF-based estimate 122 and the motion-based estimate 124 can be fused by the fusion module 126 according to any data or information fusion technique. In one embodiment, let $N_{RF}$ and $N_{MD}$ represent the occupant estimates 122 and 124 given by the RF subsystem 104 and the motion detector subsystem 106, respectively. The variance of the two systems can be denoted by $V_{RF}$ and $V_{MD}$ respectively. The two occupant estimates can then be fused by the fusion module 126 to get the final occupancy count N by the equation:

$$N = \frac{\frac{N_{MD}}{V_{MD}} + \frac{N_{RF}}{V_{RF}}}{\frac{1}{V_{MD}} + \frac{1}{V_{RF}}}$$

If desired, the computational error can also be analyzed by determining the probability of errors occurring each time the system 100 makes an occupancy determination. For example, the probability of incurring at most 'k' errors in a year is given by:

$$Prob(0 \leq k \leq 4) = \sum_{k=0}^{4} \binom{N}{k} p_{fail}^k (1 - p_{fail})^{N-k},$$

where N is the total number of reported estimates in a year, and $p_{fail}$ is the probability of undercounting occupants by some amount. For example, if it is assumed that the system 100 reports occupancy every hour during an eight-hour work period during each weekday, $p_{fail}$=1−0.99146 denotes the current probability of undercounting the occupants by more than 10%. Such an analysis provides the minimum improvement that is needed to achieve more than 95% probability of having at most four incidents of undercounting the occupants by more than 10%. FIG. shows how the probability of failing at most four times in a year varies for different reporting frequencies as a function of $p_{fail}$. This graph (and similar graphs for other reporting frequencies) can be further used to train the algorithms 118 and 120 corresponding respectively to the subsystems 104 and 106.

Figure 7:
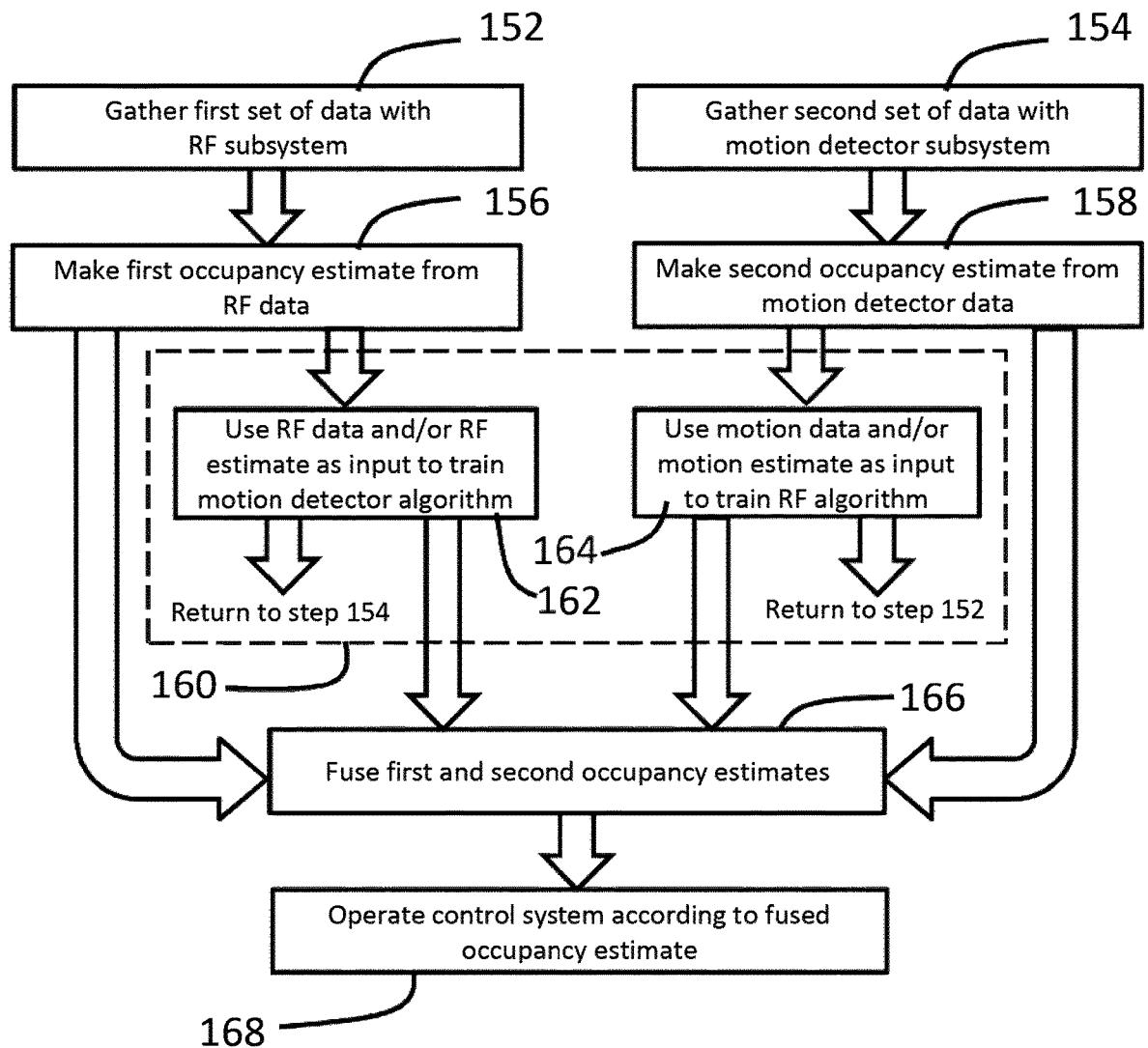
FIG. 7 is a flowchart illustrating a method of operating a system, such as the system of FIGS. 1 and 3 for determining a number of occupants in a location and operating a control system of the location in response to the number of occupants according to one embodiment disclosed herein.

FIG. 7 illustrates a method 150 for operating a system (e.g., the system 100) configured to estimate the occupancy of a location and control features or functionality of the location according to one embodiment disclosed herein. The method 150 starts at steps 152 and 154 in which a first set of data (i.e., RF data) is gathered by an RF subsystem (e.g., the RF subsystem 104) and a second set of data (i.e., motion data) is gathered by one or more motion sensors (e.g., the motion sensors of the motion detector subsystem 106). At a step 156, a first occupant estimate (e.g., the RF-based estimate 122) is made from the RF data (e.g., via the RF algorithm 118), while at a step 158 a second occupant estimate (e.g., the motion-based estimate 124) is made from the motion data (e.g., via the motion detector algorithm 120).

The method may then proceed to a reinforcement phase 160, if desired, by proceeding from the steps 156 and 158 to steps 162 and 164, respectively. At the step 162 the RF data is used as an input to train the motion detector algorithm, while at the step 164 the motion data is used an input to train the RF algorithm. For example, the RF data, including the RF-based estimate 122, could be input as a "labelled" example or known information to the motion detector algorithm 120, while the motion data, including the motion-based estimate 124, could be input as a "labelled" example or known information to the RF algorithm 118. Additional examples are provided below in which the data and/or estimate associated with each of the algorithms is used to recalibrate the parameters of the other algorithm. In this way, each of the different subsystems is used to train, or reinforce, the algorithm associated with other and the unique advantages of each subsystem is able to reinforce the ability of the algorithms to most accurately estimate occupancy. In one embodiment, only one of the algorithms is trained during the reinforcement phase 160 (e.g., either the step 162 or the step 164). The reinforcement phase 160 could be performed for each iteration of the method 150, or periodically over time. Since the RF data and estimate is used to train the motion detector algorithm, and the motion-based estimate and motion data is used to train the RF algorithm, the step 162 returns to the step 154, while the step 164 returns to the step 152.

If the reinforcement phase 160 is not used, then the steps 156 and 158 instead proceed to a step 166 in which the RF estimate and the motion-based estimate are fused (e.g., via the fusion module 126 as discussed above). Lastly, the method 150 includes a step 168 in which a control system of the location (e.g., the control system 105 of the location 102) is controlled in response to the fused estimate generated in the step 166. The method 150 can repeat as often as desired to enable the control system 105 to actively and timely operate in response to the number of occupants in the location 102.

Figure 8:
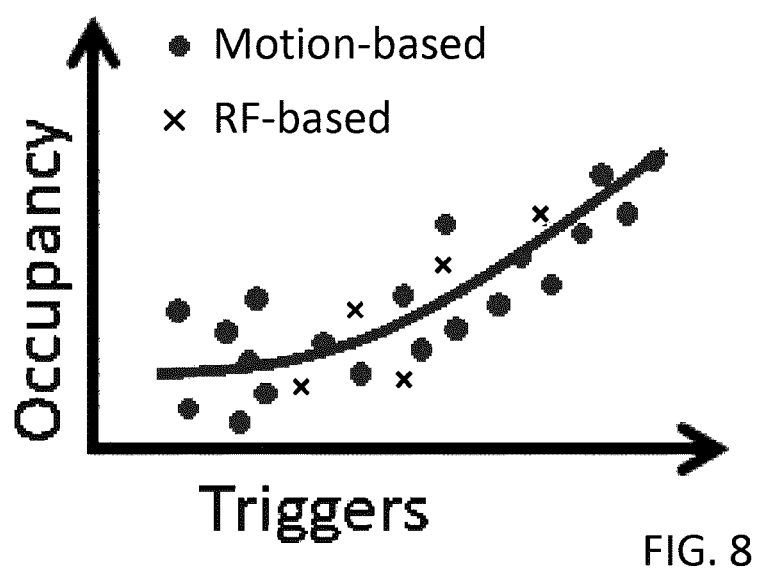
FIG. 8 is a graph illustrating how data from an RF subsystem can be used to create new data points for recalculating a function used by a motion detection subsystem according to one embodiment disclosed herein.

One embodiment for the reinforcement phase 160 of the method 150 can be appreciated in view of the above description and FIG. 8. In this embodiment, the outputs of the two subsystems 104 and 106 are fused to enhance the accuracy of the overall occupant counting. As noted above, the motion detector algorithm 120 and the motion-based estimate 124 can be based on a relationship between the true occupancy in a location and the total number of times the motion sensors of the subsystem 106 are triggered. For example, this relationship can be determined by real-life experiments or in an offline training phase using Monte Carlo or other simulation as discussed above and shown in FIG. 5. The analysis results in a set of (occupancy, trigger) pairs, which are plotted as dots in both FIGS. 5 and 8. A nonlinear function is fit to these observations to define the relationship between the occupancy and the number of sensor triggers. For example, let $f(x,\theta)$ denote the nonlinear function, where x denotes the number of sensor triggers and $\theta$ denotes one or more tunable parameters of the function f. This function f can then be used by, and/or comprise, the motion detector algorithm 120.

In this example, the tunable parameters $\theta$ can be improved using feedback provided by the RF subsystem 104. That is, the algorithm 120 corresponding to the motion detector subsystem 106 can be reinforced by inputting the data collected by the transceivers of the RF subsystem 104 and/or inputting the RF-based estimate 122, during training of the algorithm 120. That is, the data from the two subsystems 104 and 106 can be synchronized, e.g., using timestamps, to obtain the total number of motion sensor triggers that corresponds not only to the motion-based estimate 124, but also to the RF-based estimate 122. This results in additional observation-pairs of the type (occupancy, triggers), where the occupancy value is not provided from simulations/experimentations, but instead from the data of the RF subsystem 104 (e.g., from the RF-based estimate 122). These data points are denoted as Xs in the example FIG. 8. The parameters θ can be recalibrated using this new set of data points in order to recalculate the function f, which in turn redefines the algorithm 120. Moreover, these observations may be weighted differently than the results of the simulations/experiments to reflect the confidence in the estimates provided by the RF subsystem 104 (e.g., the estimate 122 generated via the data of the RF subsystem 104 could be weighted more or less heavily than the simulation/experiments). The recalibration may be performed periodically, or triggered due to events, such as the detected ingress of a large crowd or a scheduled event.

As another embodiment for the reinforcement phase 160, the data collected by the motion detector subsystem 106 and/or the motion-based estimate 124 may alternatively or additionally be used to improve the accuracy of the RF-based estimate 122. For example, procedures such as Successive Silhouette Cancellation (SSC) may be employed by the RF algorithm 118 to overcome the aforementioned near-far problem. Again, the near-far problem arises when reflections off nearer occupants have more power than reflections off more distant occupants, thereby obfuscating the signals from the distant occupants, and frustrating the ability of the RF subsystem 106 to detect or track these occupants. SSC generally entails mapping the location of the nearest occupant that would have generated the TOF measurements and then cancelling this effect to recover the locations of other occupants. To this end, the known coordinates of the motion sensors of the subsystem 106 (and/or the field of view of the motion sensors), e.g., via commissioning information that defines the locations of the motion sensors, office layout, desks, etc., can be used to verify the location of detected occupants. For example, the known coordinates of triggered sensors may be contemporaneously reviewed by the RF subsystem 104 (or timestamps used to synchronize and compare the motion data to the RF data). In this way, the parameters of the algorithm 118 are recalibrated, thereby improving the accuracy of mapping TOFs to different locations. This enhances the overall accuracy RF-based estimate 122 by improving the ability of the RF algorithm 118 to overcome the near-far problem when determining its estimate.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method for determining a number of occupants at a location using multiple modalities, comprising:
   gathering a first set of data from one or more motion sensors embedded in a lighting system in the location;
   calculating a first occupant estimate from the first set of data using a first algorithm associated with the lighting system;
   gathering a second set of data from one or more radiofrequency transceivers of an RF subsystem in the location;
   calculating a second occupant estimate from the second set of data using a second algorithm associated with the RF subsystem;
   fusing the first occupant estimate and the second occupant estimate to create a fused occupant estimate corresponding to the number of occupants at the location; and
   training the first algorithm, the second algorithm, or both the first algorithm and the second algorithm by performing at least one of (i) inputting the second occupant estimate, the second set of data, or both, to recalibrate parameters of the first algorithm and (ii) inputting the first occupant estimate, the first set of data, or both, to recalibrate parameters of the second algorithm.

2. The method of claim 1, further comprising operating a building control system in the location in response to the fused occupant estimate.

3. The method of claim 2, wherein the building control system includes a security system, a heating ventilation and air conditioning (HVAC) system, a sound masking system, the lighting system, or a combination including at least one of the foregoing.

4. The method of claim 1, wherein the one or more motion sensors comprise a passive infrared (PIR) sensor and the one or more RF transceivers comprise a Wi-Fi enabled router.

5. The method of claim 1, wherein gathering the second set of data includes emitting RF waves with the at least one RF transceiver and receiving reflections of the RF waves with the at least one RF transceiver.

6. The method of claim 1, wherein the training, prior to gathering the first or second set of data, further includes inputting data representative of a physical layout of the location, inputting data representative of coordinates of each the one or more RF transceivers, inputting data representative of coordinates of each of the one or more motion sensors, or a combination including at least one of the foregoing.

7. The method of claim 6, wherein the second set of data includes data representative of RF reflections from distant occupants that were obfuscated by RF reflections from nearer occupants, and the training includes contemporaneously or synchronously comparing the first set of data and the coordinates of each of the one or more motion sensors to the second set of data to localize positions of the distant occupants.

8. The method of claim 6, wherein the first algorithm comprises a function that is fit to a plurality of data points that describe a number of the motion sensors that are triggered with respect to a true occupant count in the location, and the training includes synchronously comparing the first data set to the second data set to form one or more new data points in which the true occupant count is set as the second occupant estimate, and recalculating the function after including the one or more new data points in the plurality of data points.

9. The method of claim 1, wherein training the first algorithm further includes building a surrogate model and simulating how many of the one or more motion sensors are triggered in response to different true occupancies and determining a function that maps the number of triggered sensors to the true occupancy.

10. The method of claim 1, wherein the fusing includes calculating the fused occupant estimate from:

$$N = \frac{\frac{N_{MD}}{V_{MD}} + \frac{N_{RF}}{V_{RF}}}{\frac{1}{V_{MD}} + \frac{1}{V_{RF}}}$$

where N is the fused occupant estimate, $N_{MD}$ is the first occupant estimate, $N_{RF}$ is the second occupant estimate, $V_{MD}$ is a first variance associated with the lighting system, and $V_{RF}$ is a second variance associated with the RF subsystem.

11. A controller for operating a building control system comprising:
a communication module configured to receive a first set of data from a lighting system having one or more motion sensors and a second set of data from a radiofrequency (RF) subsystem having one or more RF transceivers;
a memory having a first algorithm associated with the lighting system and a second algorithm associated with the RF subsystem stored therein;
a processor configured to calculate a first occupant estimate from the first set of data using the first algorithm and to calculate a second occupant estimate from the second set of data, and to train the first algorithm, the second algorithm, or both the first algorithm and the second algorithm by performing at least one of (i) inputting the second occupant estimate, the second set of data, or both, to recalibrate parameters of the first algorithm and (ii) inputting the first occupant estimate, the first set of data, or both, to recalibrate parameters of the second algorithm; and
a fusion module configured to create a fused occupant estimate by fusing the first occupant estimate and the second occupant estimate;
wherein the controller is configured to control operation of the building control system in response to the fused occupant estimate.

12. A system for determining a number of occupants at a location, comprising:
a lighting system including one or more motion sensors, the lighting system configured to gather a first set of data with the one or more motion sensors;
a radiofrequency (RF) subsystem including one or more transceivers, the RF subsystem configured to gather a second set of data with the one or more transceivers;
a controller configured to determine a first occupant estimate from the first set of data using a first algorithm associated with the lighting system and to determine a second occupant estimate from the second set of data using a second algorithm associated with the RF subsystem,
wherein the controller is configured to train the first algorithm by inputting the second occupant estimate, the second set of data, or both, to recalibrate parameters of the first algorithm, to train the second algorithm by inputting the first occupant estimate, the first set of data, or both, to recalibrate parameters the second algorithm, or a combination including at least one of the foregoing; and
a fusion module configured to create a fused occupant estimate by fusing the first occupant estimate and the second occupant estimate.

13. The system of claim 12, further comprising a building control system configured to operate in response to the fused occupant estimate.

14. The system of claim 13, wherein the building control system includes a security system, a heating ventilation and air conditioning (HVAC) system, a sound masking system, the lighting system, or a combination including at least one of the foregoing.

15. The system of claim 12, wherein the one or more motion sensor is a passive infrared sensor and the RF subsystem includes at least one network router that comprises the transceiver.

\* \* \* \* \*